US010187432B2

(12) United States Patent
Katekar et al.

(10) Patent No.: US 10,187,432 B2
(45) Date of Patent: Jan. 22, 2019

(54) REPLAYING CONTENT OF A VIRTUAL MEETING

(71) Applicant: Dolby Laboratories Licensing Corporation, San Francisco, CA (US)

(72) Inventors: Rowan James Katekar, North Sydney (AU); Glenn N. Dickins, Como (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/407,405

(22) Filed: Jan. 17, 2017

(65) Prior Publication Data

US 2017/0208105 A1 Jul. 20, 2017

Related U.S. Application Data

(60) Provisional application No. 62/279,910, filed on Jan. 18, 2016.

(30) Foreign Application Priority Data

Jan. 18, 2016 (GB) .................................. 1600907.8

(51) Int. Cl.
*H04L 29/06* (2006.01)
*G06F 17/30* (2006.01)
*H04L 12/18* (2006.01)

(52) U.S. Cl.
CPC .... *H04L 65/1083* (2013.01); *G06F 17/30817* (2013.01); *H04L 12/1827* (2013.01); *H04L 12/1831* (2013.01); *H04L 65/403* (2013.01)

(58) Field of Classification Search
CPC ............... H04L 65/403; H04L 65/1083; H04L 12/1827; H04L 12/1831; G06F 17/30817
See application file for complete search history.

(56) References Cited

U.S. PATENT DOCUMENTS

| 5,440,624 | A | 8/1995 | Schoof, II |
| 5,649,055 | A | 7/1997 | Gupta |
| 5,692,213 | A | 11/1997 | Goldberg |
| 6,288,740 | B1* | 9/2001 | Lai .......................... H04N 7/152 |
| | | | 348/14.08 |
| 6,466,250 | B1* | 10/2002 | Hein ...................... H04N 7/144 |
| | | | 348/14.08 |
| 6,959,075 | B2 | 10/2005 | Cutaia |

(Continued)

FOREIGN PATENT DOCUMENTS

| CN | 1762146 | 4/2006 |
| EP | 1773040 | 4/2007 |

(Continued)

*Primary Examiner* — Jenee Holland

(57) ABSTRACT

A method of facilitating the re-joining of a virtual meeting by a participant. The method comprises determining at what time the participant was disconnected from the virtual meeting; and determining whether or not the participant was talking within a time period containing the time at which the participant was disconnected from the virtual meeting. If it is determined that the participant was talking within the time period, then, consequently, the method comprises deciding not to enable the participant to replay stored data representative of a missed portion of the virtual meeting. As well as the method, related apparatuses, systems and computer readable storage media are disclosed.

20 Claims, 7 Drawing Sheets

(56) References Cited

U.S. PATENT DOCUMENTS

| | | |
|---|---|---|
| 8,233,606 B2 | 7/2012 | Brunson |
| 8,406,390 B1 | 3/2013 | Halferty |
| 8,942,685 B2 * | 1/2015 | Weksler ............... H04W 76/19 |
| | | 455/416 |
| 2004/0013252 A1 * | 1/2004 | Craner ................ H04M 1/247 |
| | | 379/142.01 |
| 2004/0081136 A1 * | 4/2004 | Brown ............... H04L 12/1831 |
| | | 370/352 |
| 2004/0125933 A1 * | 7/2004 | Jun ...................... H04M 3/56 |
| | | 379/202.01 |
| 2004/0190700 A1 * | 9/2004 | Cutaia ............. H04M 3/42221 |
| | | 379/202.01 |
| 2004/0203677 A1 | 10/2004 | Brown |
| 2004/0236830 A1 * | 11/2004 | Nelson ............. H04L 29/06027 |
| | | 709/204 |
| 2005/0216549 A1 | 9/2005 | Amano |
| 2005/0233736 A1 * | 10/2005 | Berstis ............... H04L 12/1831 |
| | | 455/416 |
| 2005/0237378 A1 * | 10/2005 | Rodman ........... H04L 29/06027 |
| | | 348/14.09 |
| 2006/0031290 A1 * | 2/2006 | Mannaru ............... G06Q 10/10 |
| | | 709/204 |
| 2007/0188901 A1 | 8/2007 | Heckerman |
| 2007/0263603 A1 | 11/2007 | Schmitt |
| 2007/0276913 A1 * | 11/2007 | Olson ................... G06Q 10/10 |
| | | 709/206 |
| 2008/0008458 A1 * | 1/2008 | Gudipaty ............. G11B 27/034 |
| | | 386/240 |
| 2008/0137558 A1 | 6/2008 | Baird |
| 2008/0226051 A1 * | 9/2008 | Srinivasan ......... H04L 12/1822 |
| | | 379/202.01 |
| 2008/0263010 A1 * | 10/2008 | Roychoudhuri .. G06F 17/30056 |
| 2009/0003558 A1 | 1/2009 | Katis |
| 2009/0125589 A1 | 5/2009 | Anand |
| 2010/0023224 A1 | 1/2010 | Stabrey |
| 2010/0150320 A1 * | 6/2010 | Lingafelt ............ H04L 12/1831 |
| | | 379/68 |
| 2010/0278320 A1 * | 11/2010 | Arsenault ............... H04L 12/66 |
| | | 379/88.12 |
| 2010/0284310 A1 * | 11/2010 | Shaffer ............... H04L 12/1822 |
| | | 370/260 |
| 2011/0196682 A1 * | 8/2011 | Sandgren ................ H04M 3/56 |
| | | 704/270 |
| 2011/0267419 A1 * | 11/2011 | Quinn ..................... H04N 7/15 |
| | | 348/14.08 |
| 2012/0128322 A1 * | 5/2012 | Shaffer ................ H04N 9/8205 |
| | | 386/241 |
| 2012/0185530 A1 * | 7/2012 | Reza .................. H04N 21/2343 |
| | | 709/203 |
| 2012/0213339 A1 | 8/2012 | Oliver |
| 2012/0274731 A1 * | 11/2012 | Shanmukhadas ...... H04N 7/147 |
| | | 348/14.08 |
| 2012/0275349 A1 * | 11/2012 | Boyer ................. H04L 12/1822 |
| | | 370/261 |
| 2013/0028398 A1 | 1/2013 | Mikan |
| 2013/0108034 A1 * | 5/2013 | Colbert ................. H04M 3/566 |
| | | 379/202.01 |
| 2013/0159539 A1 | 6/2013 | Lindner |
| 2013/0259446 A1 * | 10/2013 | Sathish ............... G11B 27/034 |
| | | 386/278 |
| 2013/0321562 A1 * | 12/2013 | Takahashi ........... H04L 65/1083 |
| | | 348/14.06 |
| 2013/0339431 A1 * | 12/2013 | Yannakopoulos ......................... |
| | | H04L 12/1827 |
| | | 709/204 |
| 2014/0247933 A1 * | 9/2014 | Soundar ............... H04M 3/5183 |
| | | 379/211.02 |
| 2014/0258548 A1 * | 9/2014 | Hamada .............. H04L 65/1069 |
| | | 709/227 |
| 2014/0325393 A1 | 10/2014 | Quinn |
| 2014/0362979 A1 * | 12/2014 | Kaplan ................ H04M 1/656 |
| | | 379/67.1 |
| 2015/0012270 A1 | 1/2015 | Reynolds |
| 2015/0067023 A1 * | 3/2015 | Ai ......................... H04L 65/605 |
| | | 709/203 |
| 2015/0288924 A1 * | 10/2015 | Liu .................... H04L 12/1822 |
| | | 348/14.08 |
| 2015/0319309 A1 * | 11/2015 | Cunico .................... H04M 3/56 |
| | | 379/202.01 |
| 2016/0027134 A1 * | 1/2016 | Alvarado ............... G06Q 50/18 |
| | | 705/311 |
| 2016/0065742 A1 | 3/2016 | Nasir |
| 2017/0236532 A1 * | 8/2017 | Reynolds ................ G10L 25/87 |
| | | 704/248 |
| 2018/0006837 A1 * | 1/2018 | Cartwright .......... H04L 12/1831 |

FOREIGN PATENT DOCUMENTS

| | | |
|---|---|---|
| EP | 2490424 | 8/2012 |
| WO | 2004/049608 | 6/2004 |
| WO | 2016/126816 | 8/2016 |
| WO | 2016/126819 | 8/2016 |

\* cited by examiner

255

260

605

610

615

620

REPLAYING CONTENT OF A VIRTUAL MEETING

CROSS-REFERENCE TO RELATED APPLICATION(S)

The present application claims priority to U.S. Provisional Patent Application No. 62/279,910, filed Jan. 18, 2016, and United Kingdom Patent Application No. 1600907.8, filed Jan. 18, 2016, both of which are incorporated herein by reference in their entirety.

TECHNICAL FIELD

The present disclosure generally relates to replaying, or deciding not to replay, content of a virtual meeting, and in various embodiments relates to replaying, or deciding not to replay, content of a virtual meeting while the virtual meeting is still ongoing.

BACKGROUND

Herein, a "virtual meeting" is a meeting in which participants use technology to communicate with one another, typically because not all participants are in the same physical location. For example, a voice over Internet protocol (VoIP) teleconferencing system is suitable for enabling virtual meetings.

As the popularity of virtual meetings has increased, so have efforts to make virtual meetings more reliable and productive. For example, it is recognised that sometimes a participant in a virtual meeting will temporarily become disconnected from the virtual meeting, e.g. due to network problems affecting the participant's uplink and/or downlink with one or more servers hosting the virtual meeting. In connection with this inconvenience, the United States patent application published under number US 2010/0150320 A1, titled "Handling Communication Session Disconnection and Reconnection," provides a system which records "missed information" that is communicated between participants in a virtual meeting while one or more other participants are temporarily disconnected from the virtual meeting. If the temporarily-disconnected participant(s) re-join the virtual meeting while it is still ongoing, the system begins replaying the missed information to the temporarily-disconnected participant(s) on re-joining the virtual meeting. A benefit of this is that it can obviate the need for the temporarily-disconnected participant(s) to ask one or more of the other participants to summarise the missed information.

There remain opportunities to improve the ways systems deal with the re-joining or late-joining of virtual meetings by participants.

BRIEF DESCRIPTION OF THE DRAWINGS

Example embodiments will now be described with reference to the accompanying drawings, in which.

All the Figures are schematic and generally only show parts which are necessary in order to elucidate the disclosure, whereas other parts may be omitted or merely suggested. Unless otherwise indicated, like reference numerals refer to like parts in different Figures.

DETAILED DESCRIPTION

Figure 1:
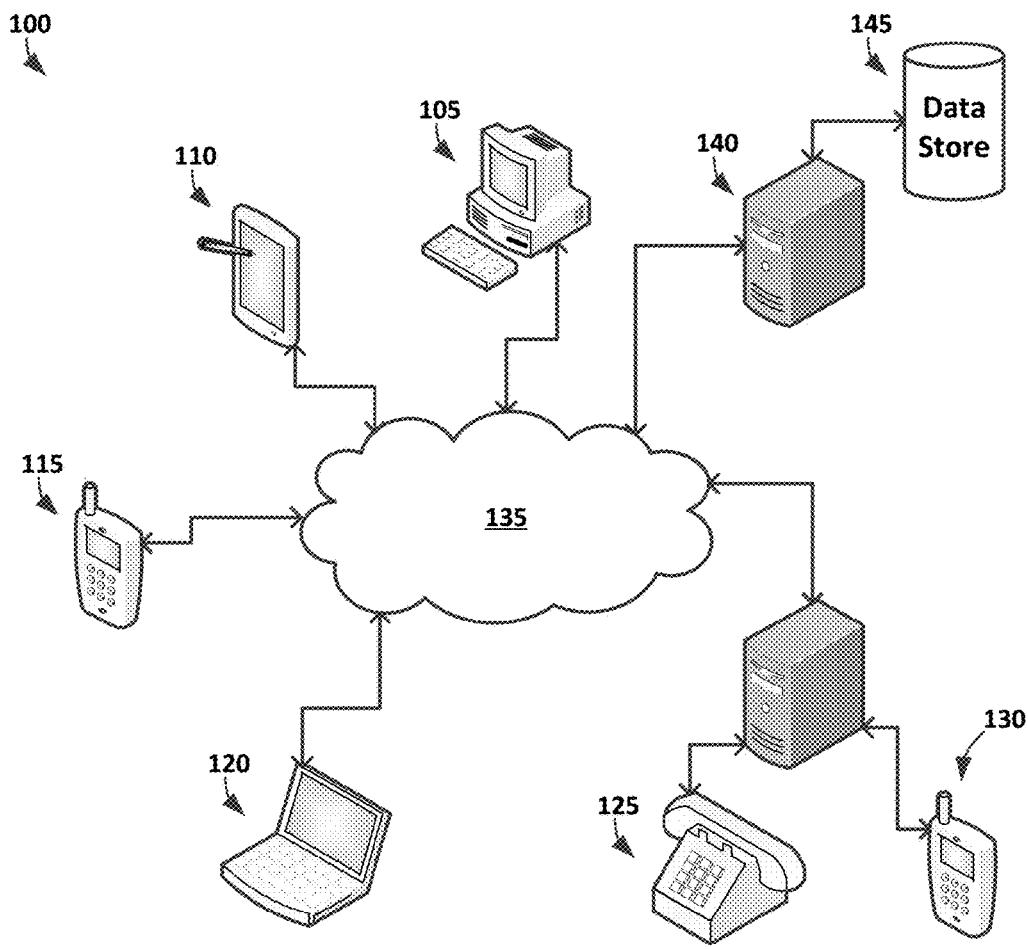
FIG. 1 provides a schematic overview of a virtual-meeting system according to at least one embodiment.

In view of the above it is an object, inter alia, to reduce in some cases the overhead associated with permitting a (re-)joining participant to replay "missed" content of the virtual meeting. A further object, inter alia, is to improve the intelligibility of the "missed" content that is replayed to a (re-)joining participant. A further object, inter alia, is to accelerate the replay of the "missed" content, thereby allowing a (re-)joining participant to fully (re-)join the virtual meeting sooner.

A. OVERVIEW

One aspect of the present disclosure provides a method of facilitating the re-joining of a virtual meeting by a participant. The method comprises determining at what time the participant was disconnected from the virtual meeting, and determining whether or not the participant was talking within a time period containing the time at which the participant was disconnected from the virtual meeting. The method further comprises, responsive to determining that the participant was talking within the time period, deciding not to enable the participant to replay stored data representative of a missed portion of the virtual meeting.

Optionally, the method further comprises accessing stored information about at least a part of the virtual meeting during the time period, the accessed information including at least one voice activity detection flag corresponding to a time within the time period.

Optionally, said determining comprises: analyzing the at least one voice activity detection flag; and determining, as a result of the at least one voice activity detection flag being asserted, that the participant was talking within the time period.

Optionally, said determining further comprises determining one or more characteristics of said talking. Optionally, the accessed information includes a plurality of voice activity detection flags corresponding to the time period; and said determining one or more characteristics of said talking comprises analyzing the plurality of voice activity detection flags to thereby determine one or more of: for what proportion of the time period the participant was talking, a total number of bursts of speech by the participant during the time period or a longest burst of speech by the participant during the time period.

Optionally, the method further comprises determining how long ago the participant was disconnected from the virtual meeting.

Optionally, said deciding comprises deciding not to enable the participant to replay stored information representative of a missed portion of the virtual meeting only if it is determined that the participant was disconnected from the virtual meeting more than a predetermined length of time ago.

Optionally, said method further comprises, responsive to determining that the participant was not talking within the time period, deciding to enable the participant to replay stored data representative of a missed portion of the virtual meeting.

A further aspect of the present disclosure provides a method of facilitating the late-joining or re-joining of a virtual meeting by a participant. The method comprises, responsive to determining that the participant is re-joining the virtual meeting, determining at what time the participant was disconnected from the virtual meeting; or responsive to determining that the participant is late-joining the virtual meeting, determining at what time the virtual meeting began. The method further comprises, responsive to determining that the virtual meeting began, or the participant was disconnected from the virtual meeting, less than a predetermined length of time ago, deciding not to enable the participant to replay stored data representative of a missed portion of the virtual meeting.

A yet further aspect of the present disclosure provides a method of facilitating the re-joining of a virtual meeting by a participant. The method comprises determining at what time the participant was disconnected from the virtual meeting; and comparing a threshold intelligibility level with an estimated intelligibility level computed for virtual-meeting data received by the participant during a time period preceding the time at which the participant was disconnected from the virtual meeting. The method further comprises, responsive to determining that the estimated intelligibility level is less than the threshold intelligibility level, deciding to enable the participant to replay stored data representative of a missed portion of the virtual meeting and an earlier portion of the virtual meeting.

Optionally, the method further comprises analyzing the estimated intelligibility level; and determining an overall duration of the earlier portion of the virtual meeting based on the analysis.

Optionally, the earlier portion of the virtual meeting has a predetermined overall duration.

Optionally, the earlier portion of the virtual meeting is contiguous with the missed portion of the virtual meeting.

Another aspect of the present disclosure provides a method of rendering data representative of a virtual meeting. The method comprises receiving first data, representative of a missed portion of the virtual meeting; and receiving second data, representative of a current portion the virtual meeting. the method further comprises simultaneously rendering the first data and the second data, such that the participant perceives sound from the missed portion of the virtual meeting as originating from a first spatial location, and sound from the current portion of the virtual meeting as originating from a second spatial location, the second spatial location being different from the first spatial location.

Optionally, the method further comprises determining whether or not speech from the same participant is represented in both the first data and the second data.

Optionally, the method further comprises, responsive to determining that speech from the same participant is represented in both the first data and the second data, arranging playback of the first and second data relative to one another such that said playback does not result in the participant perceiving speech from the same participant as originating from this first location and the second location simultaneously.

Optionally, said arranging playback comprises pausing playback of the first data.

Optionally, said arranging playback comprises skipping playback of a part of the first data which is representative of speech of said same participant.

A further aspect of the present disclosure provides a method of facilitating the re-joining of a virtual meeting by a participant. The method comprises determining whether or not the participant was talking within a time period containing the time at which the re-joining was initiated. The method further comprises, if it is determined that the participant was talking within the time period, deciding, as a consequence, not to enable the participant to replay stored data representative of a missed portion of the virtual meeting.

Optionally, the determining comprises: analyzing at least one voice activity detection flag which is associated with the participant and is from within the time period; and determining, as a result of the at least one voice activity detection flag being asserted, that the participant was talking within the time period.

Optionally, the method further comprises, if it is determined that the participant was not talking within the time period, deciding, as a consequence, to enable the participant to replay stored data representative of a missed portion of the virtual meeting.

Yet another aspect of the present disclosure provides an apparatus, in a system for facilitating virtual meetings, the apparatus being configured to perform any of the above methods.

Yet another aspect of the present disclosure provides a computer readable medium comprising instructions, which, when executed by an apparatus in a system for facilitating virtual meetings, configures the apparatus to perform any of the above methods.

By finding scenarios in which it can be assumed that a re-joining or late-joining participant does not need to hear and/or see missed portion of a virtual meeting, and therefore permitting the participant to join or re-join the virtual meeting without replaying the missed portion, the participant is able to join or re-join the virtual meeting sooner, and unnecessary network traffic can be reduced or even avoided.

By playing a missed portion of a virtual meeting in parallel with a live portion of the virtual meeting, again the participant is able to join or re-join the virtual meeting sooner.

B. EXAMPLE EMBODIMENTS

In the accompanying drawings, FIGS. 1 to 8B generally show a virtual-meeting system according to at least one embodiment, some main components of the virtual-meeting system and some of the data which is exchanged between the main components. Then FIGS. 9 to 12 schematically show methods performed within the virtual-meeting system, and finally FIG. 13 schematically shows an example special-purpose computer suitable for use in implementing the methods.

B-I. Overview of Virtual-Meeting System

As shown in FIG. 1, a virtual-meeting system 100 according to at least one embodiment comprises a plurality of telephone endpoints 105, 110, 115, 120, 125, 130 connected to each other via a network 135. The virtual-meeting system 100 further comprises a virtual-meeting server 140 connected to the telephone endpoints 105, 110, 115, 120, 125, 130 via the network 135, and a data store 145 connected to the virtual-meeting server 140.

The plurality of telephone endpoints 105, 110, 115, 120, 125, 130 comprises special-purpose computing devices 105, 110, 115, 120 configured to implement the techniques described herein, as well as, optionally, a conventional telephone 125 and a conventional mobile telephone 130. Example telephone endpoints based on special-purpose computing devices include desktop personal computers, laptop personal computers, tablet computers, smart phones, conference phones and the like. Other suitable telephone endpoints, which fall within the scope of the accompanying claims, will be readily appreciated by those skilled in the art.

The network 135 is an Internet Protocol (IP) based network, typically comprising the Internet. Thus communications between the telephone endpoints 105, 110, 115, 120, 125, 130 comprise IP based communications. Telephone endpoints such as the conventional telephone 125 and the conventional mobile telephone 130 may connect to the network 135 via conventional connections, such as a plain old telephone service (POTS) connection, an Integrated Services Digital Network (ISDN) connection, a cellular network collection, or the like, in a conventional manner (well known in VoIP communications).

Figure 2:
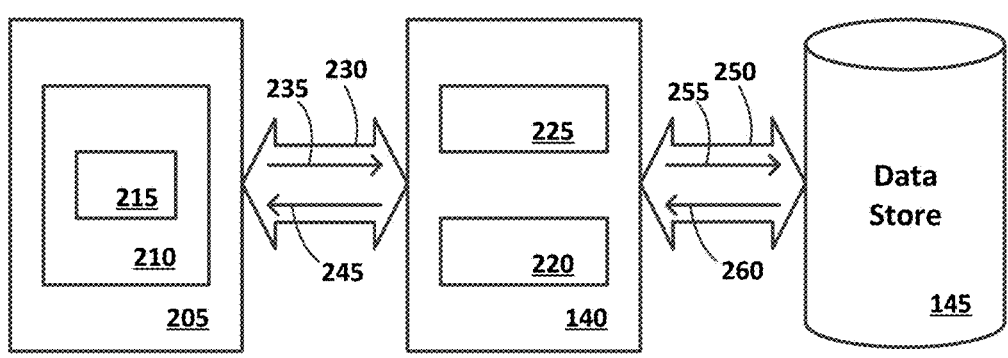
FIG. 2 schematically shows in more detail three components of the virtual-meeting system shown in FIG. 1, and some of the data communicated between the three components.

As shown in FIG. 2, in the virtual-meeting system 100, an IP-compatible telephone endpoint 205 (referred to hereinafter as the IP endpoint 205), e.g. any one of the telephone endpoints 105, 110, 115, 120, comprises a virtual-meeting application 210 whereby the IP endpoint 205 can participate in virtual meetings hosted by the virtual-meeting system 100.

In various practical implementations, the virtual-meeting application 210 may be available as an application suitable for desktop operating systems, an application suitable for mobile operating systems, a web browser plug-in or a native library. Typically, it manages applicable network protocols in order to be able to communicate with the virtual-meeting server 140, as well as managing any audio and/or video hardware integrated into or connected to the IP endpoint 205 in order to render audio and/or video data received in connection with a virtual meeting.

The virtual-meeting application 210 comprises a re-join module 215. The re-join module 215 enables the virtual-meeting application 210 to re-join a virtual meeting hosted by the virtual-meeting server 140.

The virtual-meeting server 140 comprises a virtual-meeting manager 220 which is configured to cooperate with the virtual-meeting application 210. The virtual-meeting server 140 further comprises a catch-up module 225 which is in communication with the virtual-meeting manager 220 and is configured to cooperate with the re-join module 215.

A bidirectional communication channel 230 is present between the virtual-meeting server 140 and the IP endpoint 205. The bidirectional communication channel 230 comprises an uplink stream 235, from the IP endpoint 205 to the virtual-meeting server 140, and a downlink stream 245, from the virtual-meeting server 140 to the IP endpoint 205.

By way of broad overview, the virtual-meeting server 140 (specifically, in the present embodiment, the virtual-meeting manager 220) is configured to receive the uplink stream 235, and respective uplink streams from the other telephone endpoints which are joined to the same virtual meeting, and to generate therefrom a respective downlink stream for each of said telephone endpoints (including generating the downlink stream 245 for the IP endpoint 205). Thus, typically, each telephone endpoint's downlink stream includes audio data from the respective uplink streams of every other telephone endpoint (but not from its own uplink stream). Accordingly, a participant in a virtual meeting can hear, when his own downlink is rendered, the respective voices of all other participants (but not his own voice).

More specifically, in some practical implementations, the virtual-meeting manager 220 may be responsible for providing a northbound interface to a service provider application server, and may implement Media Server Mark-up Language (MSML)/Session Initiation Protocol (SIP) protocols and manage the life-cycle of a virtual meeting. It may also be responsible for the "mechanics" of controlling virtual meetings in real time, e.g. controlling the joining and leaving of participants, the respective spatial locations of participants if the virtual meeting is to be spatially rendered, and the like.

A bidirectional communication channel 250 is also present between the virtual-meeting server 140 and the data store 145. This bidirectional communication channel 250 comprises an uplink stream 260, from the data store 145 to the virtual-meeting server 140, and a downlink stream 255, from the virtual-meeting server 140 to the data store 145. Thus, the data store 145 may be thought of as a "dummy" participant in a given virtual meeting hosted by the virtual-meeting server 140. For example, the virtual-meeting manager 220 may associate the data store 145 with a special client type, so that, for example, the uplink stream 260 is treated differently from the respective uplink streams of the endpoints participating in the virtual meeting, and so that any performance statistics may ignore the downlink stream 255 in the uplink stream 260. Also, in connection with spatial rendering, by associating the data store 145 with the special client type, the virtual-meeting manager 220 can straightforwardly allocate respective spatial locations to the endpoints participating in the virtual meeting, and not allocate a spatial location to the data store 145. In one embodiment, the data store 145 may comprise a media proxy server.

The data store 145 is configured to store all of the pertinent data that it receives through the downlink stream 255. It will be appreciated that (in perfect conditions) the downlink stream 255 includes, inter alia, all of the audio data generated by all of the telephone endpoints connected to a given virtual meeting. In other words, in perfect conditions, the data store 145 comprises a "recording" of everything that was said during a given virtual meeting.

B-II. Communication Channels

As described above, the bidirectional communication channel 230 comprises the uplink stream 235, from the IP endpoint 205 to the virtual-meeting server 140, and the downlink stream 245, from the virtual-meeting server 140 to the IP endpoint 205.

Figure 3A:
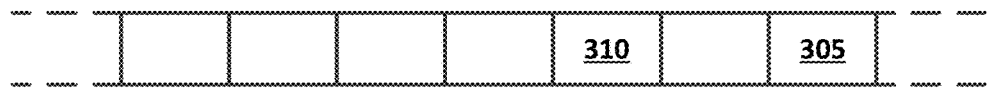
FIGS. 3A and 3B schematically show more detail of some of the communicated data shown in FIG. 2, including example data packets.
Figure 3B:

As shown in FIGS. 3A and 3B, the uplink stream 235 and the downlink stream 245 each comprise a respective stream of packets.

Referring to FIG. 3A, the packets of the uplink stream 235 can include, inter alia, at least one re-join packet 305 and a plurality of live packets 310.

Figure 4A:
FIGS. 4A and 4B schematically show more detail of the example data packets shown in FIG. 3A.

Referring now to FIG. 4A, the (or each) re-join packet 305 is generated by the re-join module 215 of the IP endpoint 205, and, inter alia, comprises a request to re-join a virtual meeting from which the IP endpoint 205 was disconnected. Along with the re-join request, the (or each) re-join packet 305 comprises data to support the request, which includes, inter alia, an identifier of said virtual meeting, a time stamp of a most-recent packet received by the IP endpoint 205 (before disconnection) in respect of said virtual meeting and a time stamp of a most-recent "intelligible" packet received by the IP endpoint 205 (before disconnection) in respect of said virtual meeting. In the present embodiment, the time stamp of the most-recent intelligible packet represents a time after which, and up until the moment which the IP endpoint 205 was disconnected, the data received by the IP endpoint 205, when rendered, is estimated to be unintelligible.

Figure 4B:
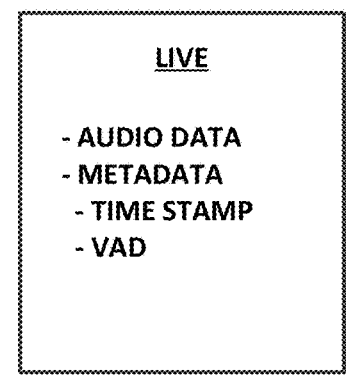

Referring now to FIG. 4B, each live packet 310 is generated by the virtual-meeting application 210 of the IP endpoint 205, and, inter alia, comprises audio data and associated metadata. The audio data is representative of sound captured by the IP endpoint 205 via a sound-capture device—e.g. a microphone—connected to or integrated into the IP endpoint 205. The metadata includes a time stamp, which is indicative of the time at which the associated audio data was captured, and a voice activity detection (VAD) flag, which typically is a two-state flag (asserted or de-asserted) indicative of whether (asserted) or not (de-asserted) said captured sound includes speech.

Referring to FIG. 3B, the packets of the downlink stream 245 can include, inter alia, at least one catch-up packet 315 and a plurality of live packets 320.

Figure 5A:
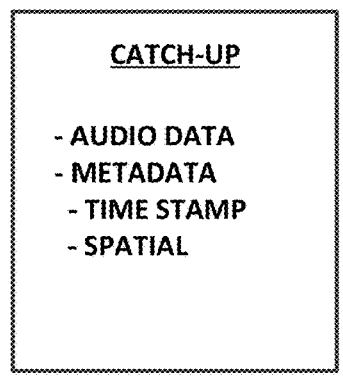
FIGS. 5A and 5B schematically show more detail of the example data packets shown in FIG. 3B.

Referring now to FIG. 5A, the (or each) catch-up packet 315 is generated by the virtual-meeting server 140, and, inter alia, comprises audio data and associated metadata. The audio data has been retrieved from the data store 145 and is representative of sound captured earlier in said virtual meeting. The metadata includes a time stamp, which is indicative of the time at which the associated audio data was captured, and spatial information configured to enable spatial render of the associated audio data by, inter alia, the IP endpoint 205.

Figure 5B:
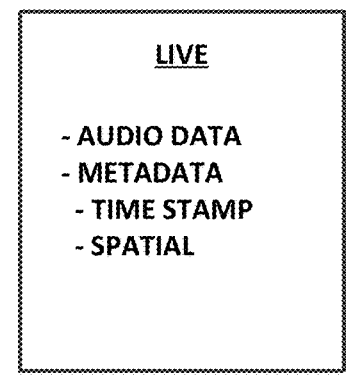

Referring now to FIG. 5B, each live packet 320 is generated by the virtual-meeting server 140 (generally in the manner described in broad overview in the previous section), and, inter alia, comprises audio data and associated metadata. The audio data is representative of "live" or "real-time" sound captured (by the other endpoints) and transmitted during said virtual meeting. The metadata includes a time stamp, which is indicative of the time at which the associated audio data was captured, and spatial information configured to enable spatial render of the associated audio data by, inter alia, the IP endpoint 205.

As described in the previous section, the bidirectional communication channel 250 comprises the uplink stream 260, from the data store 145 to the virtual-meeting server 140, and the downlink stream 255, from the virtual-meeting server 140 to the data store 145.

Figure 6A:
FIGS. 6A and 6B schematically show more detail of some of the communicated data shown in FIG. 2, including example data packets.
Figure 6B:

As shown in FIGS. 6A and 6B, the uplink stream 260 and the downlink stream 255 each comprise a respective stream of packets.

Referring to FIG. 6A, the packets of the downlink stream 255 can include, inter alia, at least one recording packet 605 and at least one statistics packet 610.

Figure 7A:
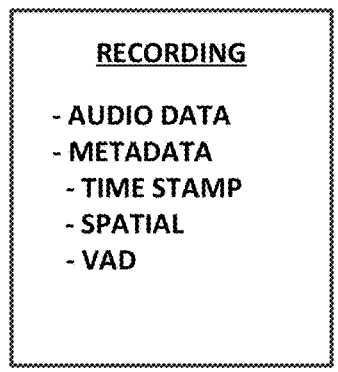
FIGS. 7A and 7B schematically show more detail of the example data packets shown in FIG. 6A.

Referring now to FIG. 7A, the (or each) recording packet 605 is generated by the virtual-meeting server 140, and, inter alia, comprises audio data and associated metadata. The audio data is representative of respective "live" or "real time" sound captured and transmitted by the endpoints during said virtual meeting. The metadata includes a time stamp, spatial information for enabling a renderer to spatially-render the associated audio data, a plurality of VAD flags (a respective VAD flag for each of the endpoints) and an identifier of the respective IP endpoint 205. The identifier is unique to the respective IP endpoint 205, at least within the virtual meeting, and therefore the identifier can be used to determine from which IP endpoint 205 the audio data and associated metadata originates.

Figure 7B:
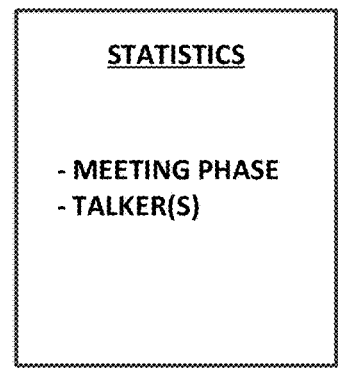

Referring now to FIG. 7B, the (or each) statistics packet 610 is generated by the virtual-meeting server 140, and, inter alia, comprises a time stamp indicating when the virtual meeting began (which may be a time at which a first participant joins the virtual meeting), information indicating a current phase of the virtual meeting (e.g., selected from the following predetermined segments or phases: "Mutual Silence", "Babble", "Presentation", "Discussion" and "Question and Answer"), and information indicating the main talker(s) (if any) in the current phase of the virtual meeting. For details of one example method of determining said segments or phases, refer to international patent application number PCT/CN2015/072161 (applicant's reference D14046B).

Referring to FIG. 6B, the packets of the uplink stream 260 can include, inter alia, at least one retrieved-audio packet 615 and at least one retrieved-statistics packet 620.

Figure 8A:
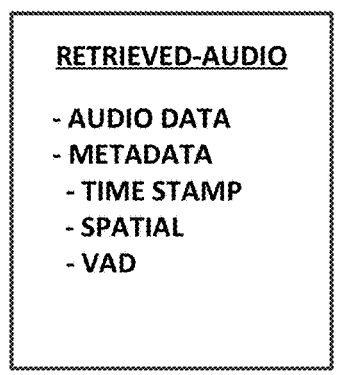
FIGS. 8A and 8B schematically show more detail of the example data packets shown in FIG. 6B.

Referring now to FIG. 8A, the (or each) retrieved-audio packet 615 is retrieved from the data store 145, and corresponds to the, or one of the, recording packets 605 generated by the virtual-meeting server 140. The retrieved-audio packet 615 comprises, inter alia, audio data and associated metadata. The audio data is substantially the same as the audio data of the corresponding recording packet 605, and as such is representative of sound captured and transmitted by the endpoints earlier in said virtual meeting. The metadata is substantially the same as the metadata in the corresponding recording packet 605, and, therefore, includes a time stamp, spatial information for enabling a renderer to spatially-render the associated audio data, and a plurality of VAD flags.

Figure 8B:
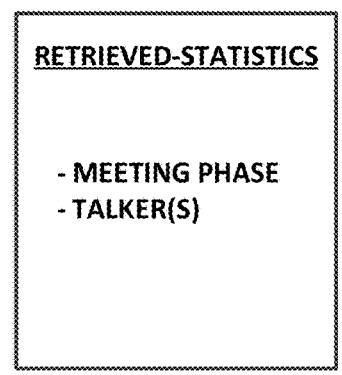

Referring now to FIG. 8B, the (or each) retrieved-statistics packet 620 is retrieved from the data store 145, and corresponds to the or one of the statistics packet 610 generated by the virtual-meeting server 140. The retrieved-statistics packet 620 therefore comprises, inter alia, a time stamp indicating when the virtual meeting began, information indicating a current (relative to the time stamp) phase of the virtual meeting, and information indicating the main talker(s) in the current phase of the virtual meeting.

The foregoing description covers the virtual-meeting system 100 in detail. The following description focuses on various techniques and methods performed by the virtual-meeting system 100 and/or the components thereof.

B-III. Joining or Re-Joining after Short Missed Period

Figure 9:
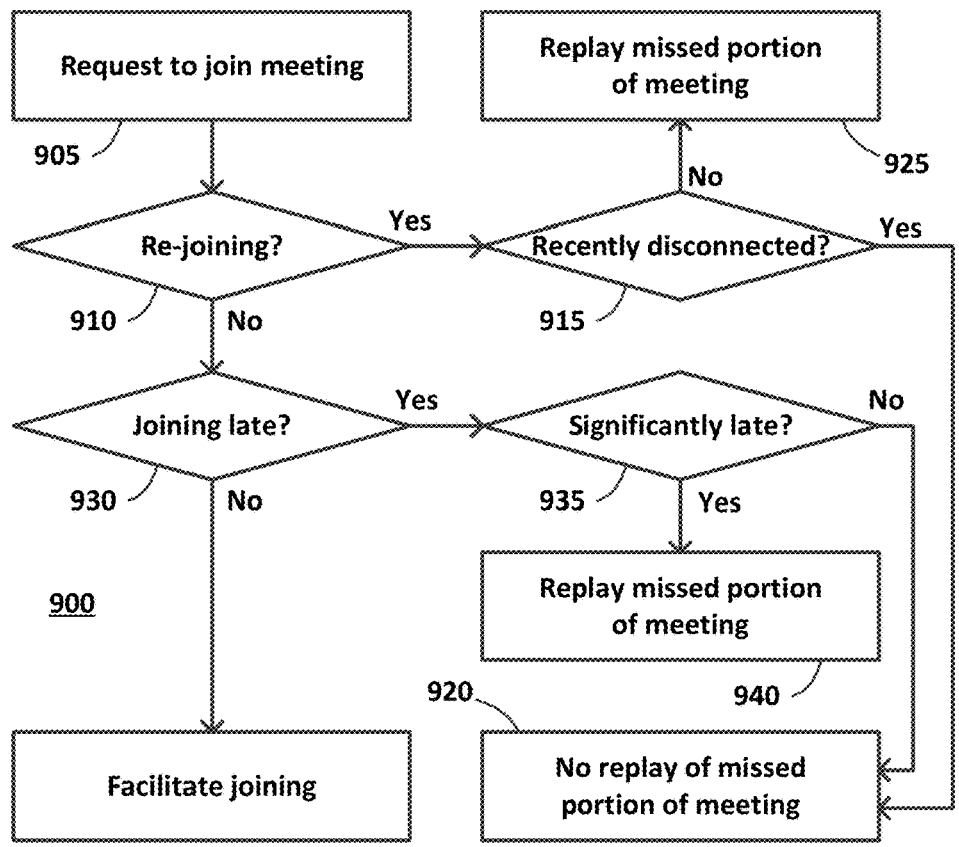
FIG. 9 schematically shows some main steps of a method of facilitating the late-joining or re-joining of a virtual meeting by a participant, in accordance with at least one embodiment.

Referring to FIG. 9, the present disclosure provides a method 900 of facilitating the late-joining or re-joining of a virtual meeting by a participant. In the present embodiment, the method 900 facilitates the late-joining or re-joining by the participant, via the IP endpoint 205, of a virtual meeting hosted by the virtual-meeting server 140.

The method 900 comprises, as an initial step 905, a request to join the virtual meeting. In the present embodiment, the IP endpoint 205 sends the request to the virtual-meeting server 140, in the uplink stream 230. If the participant is re-joining the virtual meeting, the request originates from the re-join module 215 of the virtual-meeting application 210, comprises at least one re-join packet 305 and is routed to the catch-up module 225.

As an additional step 910 (in this embodiment, performed by the catch-up module 225), the method 900 further comprises, determining whether the request to join the virtual meeting is a request to re-join the virtual meeting (after an earlier disconnection from the virtual meeting). In the present embodiment, said determining is done by observing the presence or absence of at least one re-join packet 305 contained in the request to join the virtual meeting.

If it is determined, at step 910, that the participant is re-joining the virtual meeting, then the method 900 proceeds to determining, at step 915 (in this embodiment, performed by the catch-up module 225), at what time the participant was disconnected from the virtual meeting and whether that was less than a predetermined length of time ago. In the present embodiment, said determining at what time the participant was disconnected from the virtual meeting is done by observing the time stamp of the most-recent packet received by the IP endpoint 205, which time stamp can be found in the re-join packet(s) 305. The predetermined length of time is set in accordance with user preference.

If it is determined, at step 915, that the participant was disconnected from the virtual meeting less than the predetermined length of time ago, then, consequently, the method 900 proceeds, at step 920 (in this embodiment, performed by the catch-up module 225), to decide not to enable the participant to replay, via the IP endpoint 205, stored data representative of a missed portion of the virtual meeting. Otherwise, the method 900 proceeds, at step 925 (in this embodiment, performed by the catch-up module 225), to decide to enable the participant to replay, via the IP endpoint 205, stored data representative of the missed portion of the virtual meeting.

The missed portion is represented by audio data and associated metadata stored in the data store 145. In this embodiment, replaying said stored data comprises, coordinated by the catch-up module 225, the meeting manager 220 receiving, via the uplink stream 260, a plurality of retrieved-audio packets 615 having timestamps falling within the appropriate time range, and then sending, via the downlink stream 245, a corresponding plurality of catch-up packets 315 to the IP endpoint 205.

The missed portion may include content in addition to the audio data. Such content may include, for example, video data, electronic documents, media files, and the like.

If at step 930 it is determined that the participant is late-joining the virtual meeting, then the method proceeds, at step 935 (in this embodiment, performed by the catch-up module 225), to determine at what time the virtual meeting began and whether that was less than a predetermined length of time ago. This is done by observing, in the or one of the statistics packets 610, the time stamp indicating when the virtual meeting began, and comparing the timestamp with the current time.

If it is determined, at step 935, that the virtual meeting began less than the predetermined length of time ago, then the method proceeds to deciding, at step 920 (in this embodiment, performed by the catch-up module 225), not to enable the participant to replay stored data representative of a missed portion of the virtual meeting. Otherwise, the method 900 proceeds, at step 940 (in this embodiment, performed by the catch-up module 225), to decide to enable the participant to replay, via the IP endpoint 205, stored data representative of the missed portion of the virtual meeting.

The missed portion is represented by audio data and associated metadata stored in the data store 145. For more information on the replaying of said stored data, see the discussion above in connection with step 925.

B-IV. Re-Joining after Disconnection-while-Talking

Figure 10A:
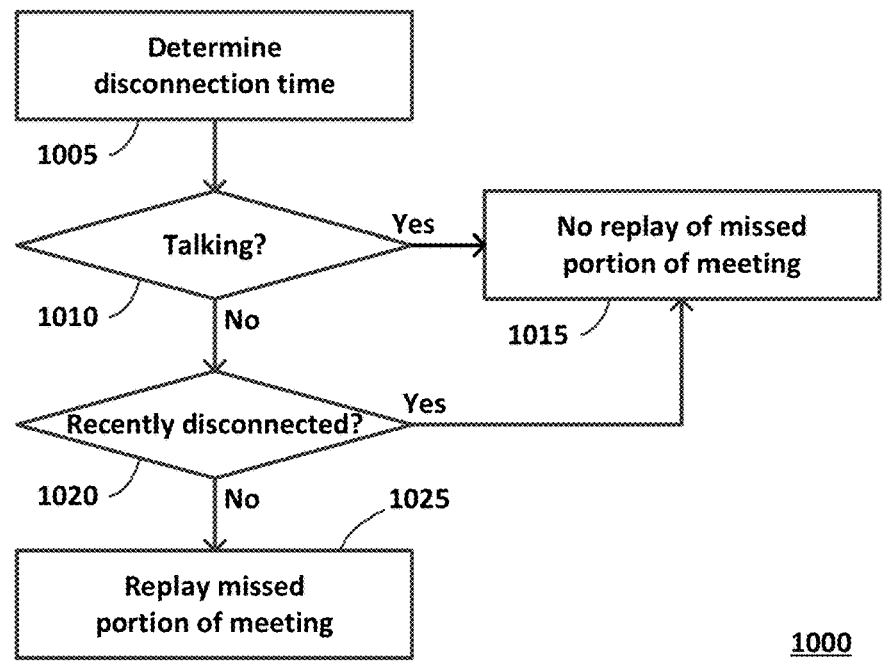
FIGS. 10A and 10B schematically show some main steps of a method of facilitating the re-joining of a virtual meeting by a participant, in accordance with at least one embodiment.

Referring to FIG. 10A, the present disclosure provides a method 1000 of facilitating the re-joining of a virtual meeting by a participant, after the participant was disconnected from the virtual meeting. In the present embodiment, the method 1000 facilitates the re-joining by the participant, via the IP endpoint 205, of a virtual meeting hosted by the virtual-meeting server 140.

In a preliminary step, before the steps of method 1000 shown in FIG. 10A, the IP endpoint 205 sends a request to the virtual-meeting server 140, in the uplink stream 230. The request originates from the re-join module 215 of the virtual-meeting application 210, comprises at least one re-join packet 305 and is routed to the catch-up module 225.

The method 1000 comprises, at step 1005 (in this embodiment, performed by the catch-up module 225), determining at what time the participant was disconnected from the virtual meeting. In the present embodiment, this is done in the same manner as described above with reference to step 915.

Figure 10B:
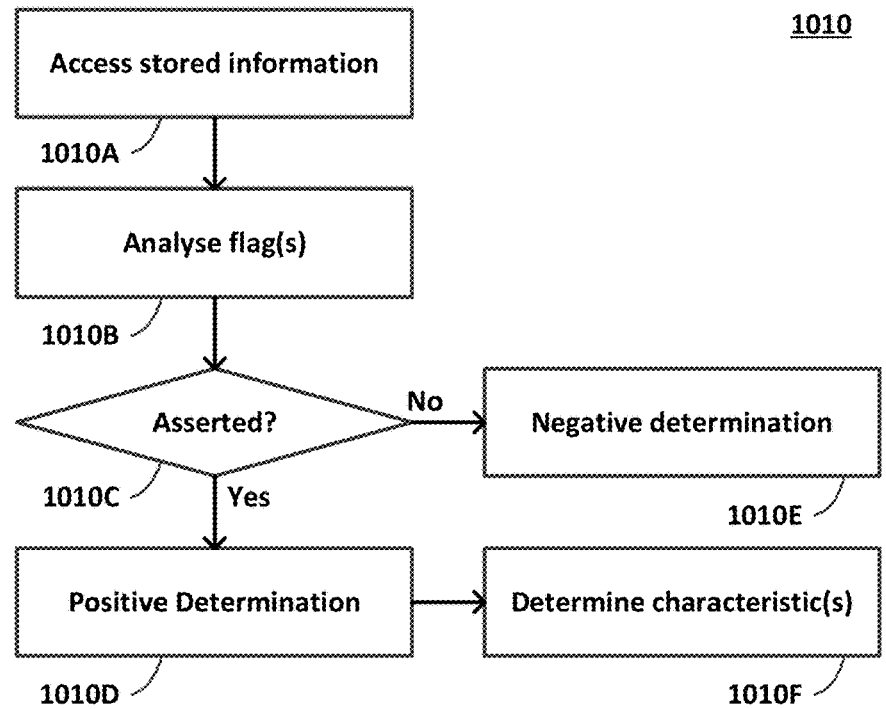

As a further step 1010 (in this embodiment, performed by the catch-up module 225), the method 1000 comprises determining whether or not the participant was talking within a time period containing the time at which the participant was disconnected from the virtual meeting. Referring to FIG. 10B, in the present embodiment, step 1010 comprises a plurality of sub-steps.

Step 1010 comprises, at sub-step 1010A, accessing stored information about at least a part of the virtual meeting during the time period. The accessed information includes at least one VAD flag corresponding to a time within the time period. In the present embodiment, the at least one VAD flag was received in one or more recording packets 605, via the downlink stream 255.

Step 1010 further comprises, at sub-step 1010B, analyzing the at least one voice activity detection flag.

Step 1010 further comprises, at sub-step 1010C, determining whether the at least one voice activity detection flag is asserted or de-asserted.

If it was found, at sub-step 1010C, that at least one voice activity detection flag is in an asserted state, the method 1000 proceeds to determine, at sub-step 1010D, that the participant was talking within the time period. Otherwise, the method 1000 proceeds to determine, at sub-step 1010E, that the participant was not talking within the time period.

In the present embodiment, after the sub-step 1010D, step 1010 comprises, at sub-step 1010F, determining one or more characteristics of said talking. In the present embodiment, the information accessed at sub-step 1010A includes a plurality of voice activity detection flags corresponding to respective different times within the time period, and the analysis performed at sub-step 1010B comprises analyzing the plurality of voice activity detection flags. Based on this analysis, at sub-step 1010F, the method 1000 determines one or more of the following characteristics of said talking: for what proportion of the time period the participant was talking, a total number of bursts of speech by the participant during the time period or a longest burst of speech by the participant during the time period.

Referring again to FIG. 10A, if it is determined, at step 1010, that the participant was talking within the time period, then the method proceeds to deciding, as a further step 1015 (in this embodiment, performed by the catch-up module 225), not to enable the participant to replay stored data representative of a missed portion of the virtual meeting. Otherwise, the method proceeds to determining, at step 1020 (in this embodiment, performed by the catch-up module 225), at what time the participant was disconnected from the virtual meeting and whether that was more than a predetermined length of time ago. In the present embodiment, this is done in the same manner as described above with reference to step 915.

If it is determined, at step 1020 that the participant was disconnected from the virtual meeting not more than a predetermined length of time ago, the method 1000 proceeds to decide, at step 1015, not to enable the participant to replay stored information representative of a missed portion of the virtual meeting.

If it is determined, at step 1020 that the participant was disconnected from the virtual meeting more than a predetermined length of time ago, the method 1000 proceeds to decide, at step 1025 (in this embodiment, performed by the catch-up module 225), to enable the participant to replay stored data representative of a missed portion of the virtual meeting.

The missed portion is represented by audio data and associated metadata stored in the data store 145. For more information on the replaying of said stored data, see the discussion above in connection with step 925.

B-V. Unintelligible Period Precedes Disconnection

Figure 11:
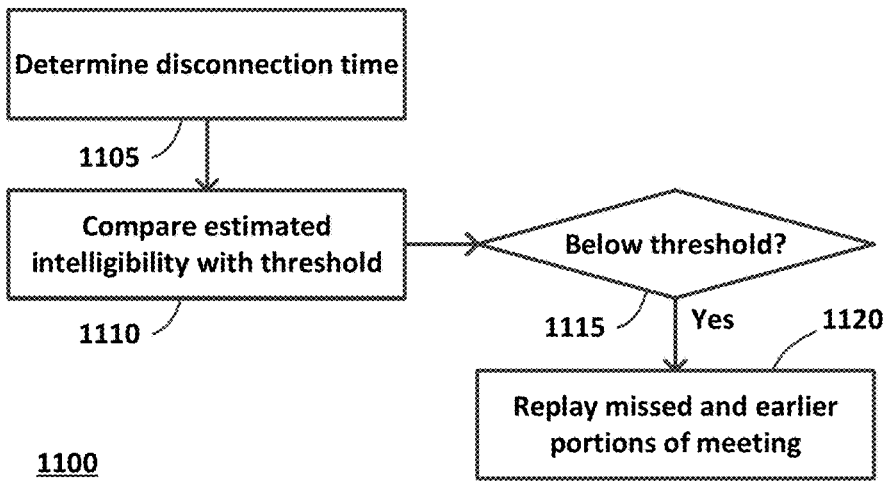
FIG. 11 schematically shows some main steps of a further method of facilitating the re-joining of a virtual meeting by a participant, in accordance with at least one embodiment.

Referring to FIG. 11, the present disclosure provides a method 1100 of facilitating the re-joining of a virtual meeting by a participant. In the present embodiment, the method 1100 facilitates the re-joining by the participant, via the IP endpoint 205, of a virtual meeting hosted by the virtual-meeting server 140.

In a preliminary step, before the steps of method 1100 shown in FIG. 11, the IP endpoint 205 sends a request to the virtual-meeting server 140, in the uplink stream 230. The request originates from the re-join module 215 of the virtual-meeting application 210, comprises at least one re-join packet 305 and is routed to the catch-up module 225.

The method 1100 comprises determining, at step 1105 (in this embodiment, performed by the catch-up module 225), at what time the participant was disconnected from the virtual meeting. In the present embodiment, this is done in the same manner as described above with reference to step 915.

Next, at step 1110 (in this embodiment, performed by the catch-up module 225), the method 1000 proceeds to compare a threshold intelligibility level with an estimated intelligibility level associated with virtual-meeting data received by the participant during a time period preceding the time at which the participant was disconnected from the virtual meeting. In the present embodiment, the estimated intelligibility level is computed at the IP endpoint 205. More specifically, the virtual-meeting application 210 controls and monitors a jitter buffer at the IP endpoint 205, and computes in real time the estimated intelligibility level based on information relating to the jitter buffer. For example, said information comprises a real time Packet Loss Rate (PLR) and a real-time Burstiness Factor (BF). No specific manner of computing the estimated intelligibility level is essential to the present embodiment; many suitable techniques are well known in the field of VoIP communications, for example.

Next, the method 1000 determines, at step 1115, whether or not the estimated intelligibility level is less than the threshold intelligibility level. In the present embodiment, this is a simple comparison of like-format levels, to see if one is higher than the other.

If it is determined, at step 1115, that the estimated intelligibility level is less than the estimated intelligibility level, then the method 1110 proceeds to decide, at step 1120, to enable the participant to replay stored data representative of a missed portion of the virtual meeting and an earlier portion of the virtual meeting. Typically, the earlier portion of the virtual meeting is contiguous with the missed portion of the virtual meeting. In some embodiments, however, there may be a "break" between the earlier portion of the virtual meeting and the (later) missed portion of the virtual meeting.

The missed portion is represented by audio data and associated metadata stored in the data store 145, and the earlier portion is represented by other audio data and associated metadata stored in the data store 145. For more information on the replaying of said stored data, see the discussion above in connection with step 925.

In the present embodiment, an overall duration of the earlier portion of the virtual meeting is adapted in dependence on the estimated intelligibility level. More specifically, the step 1120 comprises analyzing the estimated intelligibility level, and determining the overall duration of the earlier portion of the virtual meeting based on the analysis. In the present embodiment, said analyzing the estimated intelligibility level involves observing the time stamp of the most-recent intelligible packet received by the IP endpoint 205, which can be found in the re-join packet(s) 305. The overall duration of the earlier portion begins at the time indicated in said timestamp, or thereabouts, and ends at the disconnection time determined at step 1105, or thereabouts.

In other embodiments, the earlier portion of the virtual meeting has a predetermined overall duration. For example, the predetermined overall duration may be of the order of tens of seconds, up to two or three minutes.

B-VI. Simultaneous Missed and Live Content

Figure 12:
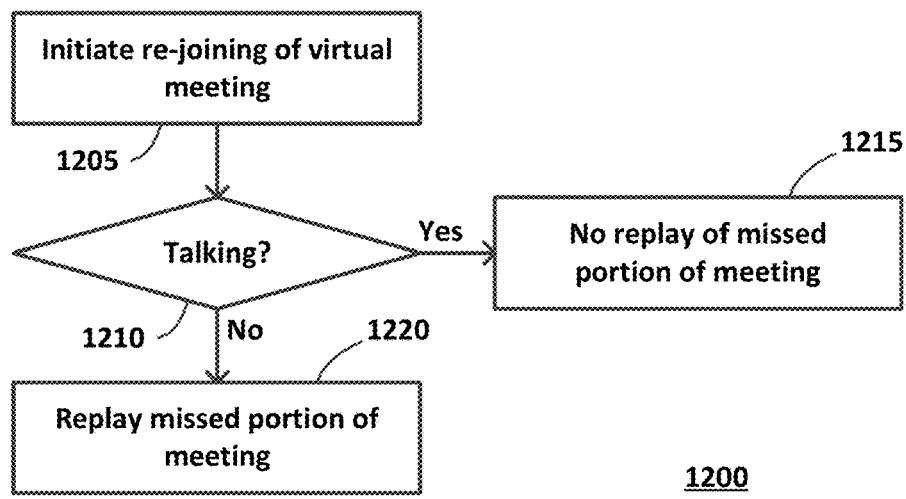
FIG. 12 schematically shows some main steps of a yet further method of facilitating the re-joining of a virtual meeting by a participant, in accordance with at least one embodiment.
Figure 13:
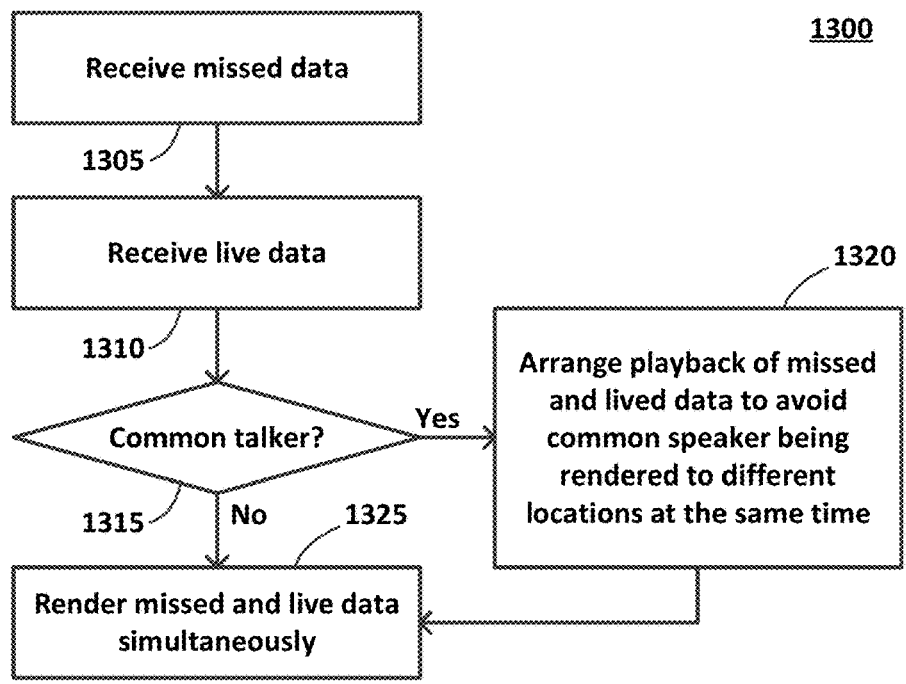
FIG. 13 schematically shows some main steps of a method of arranging playback of data representative of a virtual meeting, in accordance with at least one embodiment.

Referring to FIG. 12, the present disclosure provides a method 1200 of facilitating the re-joining of a virtual meeting by a participant. In the present embodiment, the method 1200 facilitates the re-joining by the participant, via the IP endpoint 205, of a virtual meeting hosted by the virtual-meeting server 140.

The method 1200 comprises, at step 1205, initiating the re-joining of the virtual meeting by the participant. In the present embodiment, said initiation is triggered by determining that a request to join the virtual meeting is a request to re-join the virtual, in substantially the same manner as described above with reference to steps 905 and 910 of the method 900.

Next, at step 1210, the method comprises determining (in this embodiment, performed by the catch-up module 225) whether or not the participant was talking within a time period containing the time at which the re-joining was initiated.

In the present embodiment, the time stamp in the request to join the virtual meeting is used to represent the time at which the re-joining was initiated.

In the present embodiment, said determining comprises analyzing at least one voice activity detection flag which is associated with the participant and is from within the time period. In the present embodiment, the at least one voice activity detection flag has exactly two possible states, namely "asserted" or "de-asserted", and analyzing it comprises determining its state. In the present embodiment, the at least one voice activity detection flag being asserted may lead to a determination that the participant was talking within the time period. In various embodiments, a determination that the participant was talking within the time period may require that multiple voice activity detection flags from within the time period are asserted, e.g. in a temporal distribution that meets one or more predetermined conditions.

In the present embodiment, the at least one voice activity detection flag is determined to be from within the time period if it is accompanied by (e.g., is in the same data packet as) a time stamp which falls within the time period. In the present embodiment, the length of the time period is predetermined. In the present embodiment, the length of the time period is set to a value which is high enough to enable an analysis of voice activity detection flags from within the time period to distinguish between speech and e.g. unconscious utterances.

If it is determined, at step 1210, that the participant was talking within the time period, then the method 1200 proceeds to deciding, at step 1215 (in this embodiment, performed by the catch-up module 225), not to enable the participant to replay stored data representative of a missed portion of the virtual meeting. Otherwise, the method 1200 proceeds, at step 1220 (in this embodiment, performed by the catch-up module 225), to decide to enable the participant to replay, via the IP endpoint 205, stored data representative of the missed portion of the virtual meeting.

The missed portion is represented by audio data and associated metadata stored in the data store 145. For more information on the replaying of said stored data, see the discussion above in connection with step 925.

B-VII. Simultaneous Missed and Live Content

Referring to FIG. 13, the present disclosure provides a method 1300 of arranging playback of data representative of a virtual meeting. In the present embodiment, the method 1300 is performed by the IP endpoint 205, which receives the data from the virtual-meeting server 140.

The method 1300 comprises, at step 1305, receiving data representative of a missed portion of the virtual meeting. In this embodiment, said receiving comprises the meeting manager 220, coordinated by the catch-up module 225, receiving via the uplink stream 260 a plurality of retrieved-audio packets 615 having timestamps falling within the appropriate time range, and then sending via the downlink stream 245 a corresponding plurality of catch-up packets 315 to the IP endpoint 205.

Next, at step 1310, the method 1300 comprises receiving data representative of a current portion the virtual meeting. In this embodiment, said receiving comprises receiving via the downlink stream 245 a plurality of live packets 320.

The method 1300 further comprises, at step 1325, arranging parallel playback of the data received at step 1305 and the data received at step 1310 (whereby playback of the data received at step 1305 may begin before (e.g., a few seconds before, or a few tens of seconds before), at the same time as or after (e.g., a few seconds after, or a few tens of seconds after) playback of the data received at step 1310 begins). The playback is arranged, e.g. including by rendering the data in question, such that the participant perceives sound from the missed portion of the virtual meeting as originating from one or more first spatial locations, and sound from the current portion of the virtual meeting as originating from one or more second spatial locations, the second spatial location(s) being different from the first spatial location(s); for example, each talker in the missed portion of the virtual meeting may be assigned to a respective different one of the first spatial locations, and each talker in the current portion of the virtual meeting may be assigned to a respective different one of the second spatial locations.

Playing back the two sets of received data in parallel reduces or eliminates any delay in re-joining or late-joining the virtual meeting that would arise from playing back the missed portion of the virtual meeting before rather than in parallel with the current portion of the virtual meeting, while exploiting the well-known "cocktail party effect" to maintain a sufficient degree of intelligibility.

No specific manner of performing the spatial rendering is essential to the present embodiments.

In the present embodiment, the method 1300 further comprises determining, at step 1315, whether or not speech from the same participant is represented in both the data received at step 1305 and the data received at step 1310. This step is optional, and is included in some embodiments because it has been found that perceiving the same participant to be saying different things at the same time and at different locations can hinder understanding or at least lead to a less natural listening experience.

In the present embodiment, said determining comprises the catch-up module 225 comparing the VAD flags from the aforementioned retrieved-audio packets 615 (comprising, as noted above, a respective VAD flag for each endpoint) with the VAD flags received in the respective uplink streams 235 from the other endpoints.

In some embodiments, additionally or alternatively, said determining comprises comparing the data received at step 1305 with the data received at step 1310 in terms of their respective pitches, directions of arrival, timbres, or the like, in order to identify whether or not speech from said same participant is represented in both the step-1305 data and the step-1310 data. The comparison may also determine speech from similar-sounding participants is represented in both the step-1305 data and the step-1310 data. It is noted that the comparison may be performed at the IP endpoint 205, e.g. by the re-join module 215, or upstream of the IP endpoint 205, e.g. by the catch-up module 225. Suitable techniques for such a comparison are disclosed, for example, in paragraphs 411 to 422 of International Patent Application Number PCT/CN2015/072154 (Dolby ref. D14046A).

If it is determined, at step 1315, the two received sets of data concurrently represent, respectively, first speech and second speech from the same talker, then, consequently, the method 1300 proceeds to arrange, at step 1320, playback of the two received sets of data relative to one another such that said playback does not result in the listener hearing substantial temporal overlap of the first speech and the second speech. Preferably, the listener will not hear more than five seconds of such temporal overlap. More preferably, the listener will not hear more than two seconds of such temporal overlap.

In some embodiments, if it is determined, at step 1315, that the two received sets of data concurrently represent, respectively, speech from a first talker and speech from a second talker, the second talker having a voice that sounds at least similar to the voice of the first talker, then, consequently, the method 1300 proceeds to arrange, at step 1315, playback of the first and second data relative to one another such that said playback does not result in the listener hearing substantial temporal overlap of the speech from the first talker and the speech from the second talker.

Said arranging playback may comprise one or more of pausing playback of the data representative of a missed portion of the virtual meeting, skipping playback of a part of said missed portion which is representative of speech of said same (or similar-sounding) participant, or selectively removing said same (or similar-sounding) participant from the downlink stream 245.

It will be appreciated that said arranging may be performed at the IP endpoint 205 or at the virtual-meeting server 140.

B-VIII. Equivalents, Extensions, Alternatives and Miscellaneous

Even though the present description and drawings disclose embodiments and examples, the disclosure is not restricted to these specific examples. Numerous modifications and variations can be made without departing from the scope of the present disclosure, which is defined by the accompanying claims.

For example, whereas steps 915 and 1020 were described above as making use of a time stamp in a re-joined packet 305, further embodiments may use alternative ways of determining at what time the participant was disconnected from the virtual meeting. In at least one further embodiment, the virtual-meeting server 140 comprises a jitter buffer and a module for logging network trace information related to the jitter buffer. Said logged network trace information may include an event type (e.g., receive, fetch or reset), a time stamp, a forward error correction delay, and the like. Therefore, said logged network trace information may be used to determine at what time the participant was disconnected from the virtual meeting. It may be used at the virtual-meeting server 140, or it may be transmitted (e.g. in a series of parts) to the IP endpoint 205 for use there. In at least one further embodiment, the IP endpoint 205 starts a counter on disconnection, and sends the counter value in the request to re-join, which is indicative of the time at which the participant was disconnected from the virtual meeting. For example, whereas step 1010 was described above as comprising a sub-step of analyzing the at least one voice activity detection flag, further embodiments may use additional and/or alternative ways of determining whether or not the participant was talking within a time period containing the time at which the participant was disconnected from the virtual meeting. In at least one further embodiment, step 1010 additionally or alternatively comprises analyzing the audio data in the retrieved-audio packets 615 in order to determine whether the signal represented thereby includes above-threshold levels of speech. In at least one further embodiment, step 1010 additionally or alternatively comprises polling the re-joining participant to ask him whether or not he was talking within the time period containing the time at which he was disconnected from the virtual meeting.

For example, whereas step 1010 was described above as making use of at least one VAD flag and/or the audio data in the retrieved-audio packets 615, in further embodiments the accessed information may include additional or alternative information. In at least one further embodiment, the accessed information may include an indication of an absence of audio data in the retrieved-audio packets 615; for example, a discontinuous transmission (DTX) endpoints transmits less or no audio data when it detects that its user is not speaking, in which case the indication of the absence of audio data would indicate that the user was not speaking (according to the DTX endpoint).

For example, whereas step 1010 was described above as determining what proportion of the time period the participant was talking, a total number of bursts of speech by the participant during the time period and/or a longest burst of speech by the participant during the time period, further embodiments may additionally or alternatively determine other characteristics of said talking. At least one further embodiment additionally or alternatively determines a loudness of said talking. At least one further embodiment additionally or alternatively determines a pitch of said talking. At least one further embodiment additionally or alternatively determines a timbre of said talking. At least one further embodiment additionally or alternatively determines a direction of arrival of said talking relative to a reference direction of the endpoints which capture is said talking. Any one or more of the characteristics of said talking may be compared with historical data, saved e.g. in a "talker profile", to determine e.g. an identity of who is talking, whether said talking is louder and/or high-pitched than average values, or the like.

With regard to step 1120, further embodiments may use additional or alternative methods to determine the overall duration of the earlier portion of the virtual meeting based on the analysis. At least one further embodiment additionally or alternatively polls the re-joining participant in order to have said participant selects a desired value for the overall duration of the earlier portion.

These and other aspects of the present disclosure may be appreciated from the following enumerated example embodiments (EEEs):

1. A method of facilitating the re-joining of a virtual meeting by a participant, the method comprising:
   determining at what time the participant was disconnected from the virtual meeting;
   determining whether or not the participant was talking within a time period containing the time at which the participant was disconnected from the virtual meeting; and
   if it is determined that the participant was talking within the time period, then, consequently, deciding not to enable the participant to replay stored data representative of a missed portion of the virtual meeting.

2. The method of EEE 1, further comprising:
   accessing stored information about at least a part of the virtual meeting during the time period, the accessed information including at least one voice activity detection flag corresponding to a time within the time period.

3. The method of EEE 2, wherein said determining comprises:
   analyzing the at least one voice activity detection flag; and
   determining, as a result of the at least one voice activity detection flag being asserted, that the participant was talking within the time period.
4. The method of EEE 2, wherein:
   said determining further comprises determining one or more characteristics of said talking.
5. The method of EEE 4, wherein:
   the accessed information includes a plurality of voice activity detection flags corresponding to the time period; and
   said determining one or more characteristics of said talking comprises analyzing the plurality of voice activity detection flags to thereby determine one or more of: for what proportion of the time period the participant was talking, a total number of bursts of speech by the participant during the time period or a longest burst of speech by the participant during the time period.
6. The method of any one of the foregoing EEEs,
   further comprising determining how long ago the participant was disconnected from the virtual meeting, and
   wherein said deciding comprises deciding not to enable the participant to replay stored information representative of a missed portion of the virtual meeting only if it is determined that the participant was disconnected from the virtual meeting more than a predetermined length of time ago.
7. The method of EEE 1, further comprising:
   if it is determined that the participant was not talking within the time period, then, consequently, deciding to enable the participant to replay stored data representative of a missed portion of the virtual meeting.
8. A method of facilitating the late-joining or re-joining of a virtual meeting by a participant, the method comprising:
   if the participant is re-joining the virtual meeting, then determining at what time the participant was disconnected from the virtual meeting;
   if the participant is late-joining the virtual meeting, then determining at what time the virtual meeting began; and
   if it is determined that the virtual meeting began, or the participant was disconnected from the virtual meeting, less than a predetermined length of time ago, then, consequently, deciding not to enable the participant to replay stored data representative of a missed portion of the virtual meeting.
9. A method of facilitating the re-joining of a virtual meeting by a participant, the method comprising:
   determining at what time the participant was disconnected from the virtual meeting;
   comparing a threshold intelligibility level with an estimated intelligibility level computed for virtual-meeting data received by the participant during a time period preceding the time at which the participant was disconnected from the virtual meeting; and
   if it is determined that the estimated intelligibility level is less than the threshold intelligibility level, then, consequently, deciding to enable the participant to replay stored data representative of a missed portion of the virtual meeting and an earlier portion of the virtual meeting.
10. The method of EEE 9, further comprising
   analyzing the estimated intelligibility level; and
   determining an overall duration of the earlier portion of the virtual meeting based on the analysis.
11. The method of EEE 9, wherein the earlier portion of the virtual meeting has a predetermined overall duration.
12. The method of any one of EEEs 9-11, wherein the earlier portion of the virtual meeting is contiguous with the missed portion of the virtual meeting.
13. A method of arranging playback of data representative of a virtual meeting, the method comprising:
   receiving first data, representative of a missed portion of the virtual meeting;
   receiving second data, representative of a current portion the virtual meeting; and
   arranging parallel playback of the first data and the second data, wherein said arranging is such that the listener perceives sound from the missed portion of the virtual meeting as originating from one or more first spatial locations, and sound from the current portion of the virtual meeting as originating from one or more second spatial locations, the second spatial location(s) being different from the first spatial location(s).
14. The method of EEE 13, further comprising:
   determining that the first data and the second data concurrently represent, respectively, first speech and second speech from the same talker; and
   consequently, arranging playback of the first and second data relative to one another such that said playback does not result in the listener hearing substantial temporal overlap of the first speech and the second speech.
15. The method of EEE 13 or EEE 14, further comprising:
   determining that the first and second data concurrently represent, respectively, speech from a first talker and speech from a second talker, the second talker having a voice that sounds at least similar to the voice of the first talker; and
   consequently, arranging playback of the first and second data relative to one another such that said playback does not result in the listener hearing substantial temporal overlap of the speech from the first talker and the speech from the second talker.
16. The method of EEE 14 or EEE 15, wherein:
   said arranging playback comprises pausing playback of the first data.
17. The method of EEE 14, EEE 15 or EEE 16, wherein:
   said arranging playback comprises skipping playback of a part of the first data which is representative of speech of said same talker.
18. A method of facilitating the re-joining of a virtual meeting by a participant, the method comprising:
   determining whether or not the participant was talking within a time period containing the time at which the re-joining was initiated; and
   if it is determined that the participant was talking within the time period, then, consequently, deciding not to enable the participant to replay stored data representative of a missed portion of the virtual meeting.
19. The method of EEE 18, wherein said determining comprises:
   analyzing at least one voice activity detection flag which is associated with the participant and is from within the time period; and
   determining, as a result of the at least one voice activity detection flag being asserted, that the participant was talking within the time period.
20. The method of EEE 18 or EEE 19, further comprising:
   if it is determined that the participant was not talking within the time period, then, consequently, deciding to enable the participant to replay stored data representative of a missed portion of the virtual meeting.
21. In a system for facilitating virtual meetings, an apparatus configured to perform the method of any one of EEEs 1-7.
22. A computer readable medium comprising instructions, which, when executed by an apparatus in a system for facilitating virtual meetings, configures the apparatus to perform a method according to any one of EEEs 1-7.

23. In a system for facilitating virtual meetings, an apparatus configured to perform the method of EEE 8.

24. A computer readable medium comprising instructions, which, when executed by an apparatus in a system for facilitating virtual meetings, configures the apparatus to perform a method according to EEE 8.

25. In a system for facilitating virtual meetings, an apparatus configured to perform the method of any one of EEEs 9-12.

26. A computer readable medium comprising instructions, which, when executed by an apparatus in a system for facilitating virtual meetings, configures the apparatus to perform a method according to any one of EEEs 9-12.

27. In a system for facilitating virtual meetings, an apparatus configured to perform the method of any one of EEEs 13-17.

Additionally, variations to the disclosed embodiments can be understood and effected by the skilled person in practicing the disclosure, from a study of the drawings, the disclosure, and the appended claims.

Any reference signs appearing in the claims are not to be understood as limiting their scope. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

C. EXAMPLE IMPLEMENTATION ARCHITECTURE

In various embodiments, the techniques described herein are implemented by one or more apparatus, such as one or more special-purpose computing devices. In at least one embodiment, one or more such special-purpose computing devices may be connected together and/or to other computing devices.

Figure 14:
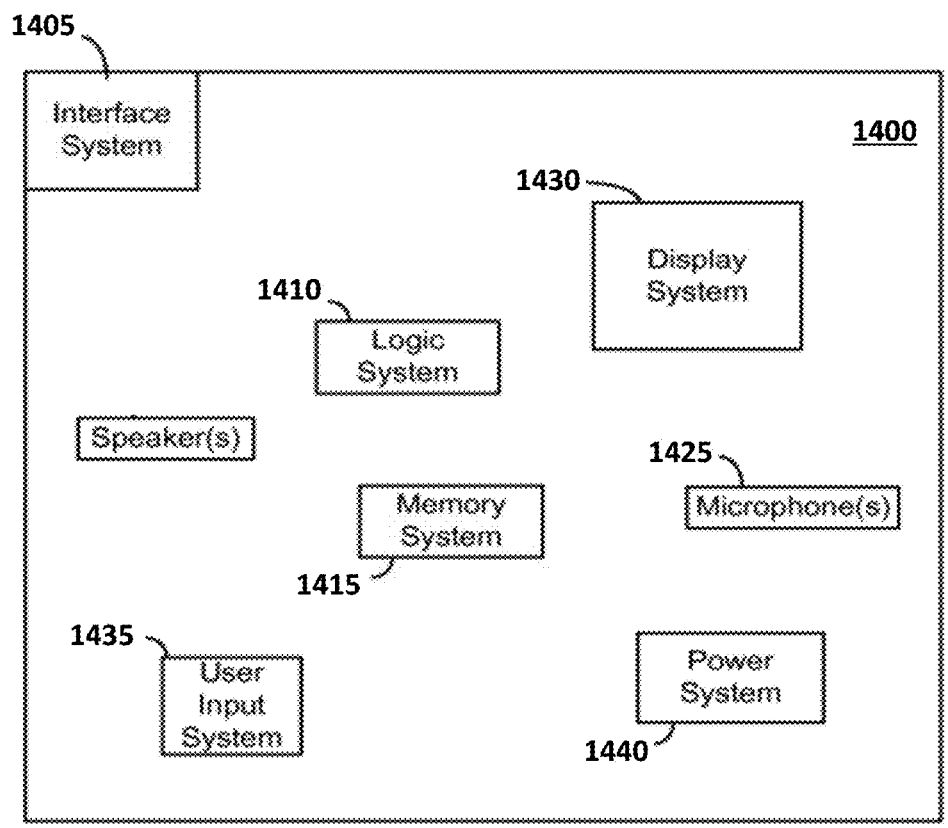
FIG. 14 schematically shows examples of components of such a special-purpose computing device which may be configured to perform the techniques disclosed herein.

FIG. 14 is a block diagram that shows examples of components of such a special-purpose computing device 1400. In this example, the computing device 1400 includes an interface system 1405. The interface system 1405 may include a network interface, such as a wireless network interface. Alternatively, or additionally, the interface system 1405 may include a universal serial bus (USB) interface or another such interface.

The device 1400 includes a logic system 1410. The logic system 1410 may include a processor, such as a general purpose single- or multi-chip processor. The logic system 1410 may include a digital signal processor (DSP), an application specific integrated circuit (ASIC), a field programmable gate array (FPGA) or other programmable logic device, discrete gate or transistor logic, or discrete hardware components, or combinations thereof. The logic system 1410 may be configured to control the other components of the device 1400. Although no interfaces between the components of the device 1400 are shown in FIG. 14, the logic system 1410 may be configured with interfaces for communication with the other components. The other components may or may not be configured for communication with one another, as appropriate.

The logic system 1410 may be configured to perform audio processing functionality, including but not limited to the techniques described herein. In some such implementations, the logic system 1410 may be configured to operate (at least in part) according to software, such as a computer program, stored one or more non-transitory media. The non-transitory media may include memory associated with the logic system 1410, such as random access memory (RAM) and/or read-only memory (ROM). The non-transitory media may include memory of the memory system 1415. The memory system 1415 may include one or more suitable types of non-transitory storage media, such as flash memory, a hard drive, etc.

The display system 1430 may include one or more suitable types of display, depending on the manifestation of the device 1400. For example, the display system 1430 may include a liquid crystal display, a plasma display, a bistable display, etc.

The user input system 1435 may include one or more devices configured to accept input from a user. In some implementations, the user input system 1435 may include a touch screen that overlays a display of the display system 1430. The user input system 1435 may include a mouse, a track ball, a gesture detection system, a joystick, one or more GUIs and/or menus presented on the display system 1430, buttons, a keyboard, switches, etc. In some implementations, the user input system 1435 may include the microphone 1425: a user may provide voice commands for the device 1400 via the microphone 1425. The logic system may be configured for speech recognition and for controlling at least some operations of the device 1400 according to such voice commands.

The power system 1440 may include one or more suitable energy storage devices, such as a nickel-cadmium battery or a lithium-ion battery. The power system 1440 may be configured to receive power from an electrical outlet.

The invention claimed is:

1. A method of facilitating re-joining of a virtual meeting having a plurality of participants, the method comprising:
   using, by one or more virtual-meeting processing devices, collected network information to determine whether any participant in the plurality of participants was disconnected from the virtual meeting;
   in response to determining that a participant was disconnected from the virtual meeting, performing by the one or more virtual-meeting processing devices:
      determining a time at which the participant was disconnected from the virtual meeting;
      determining whether or not the participant was talking within a time period containing the time at which the participant was disconnected from the virtual meeting; and
      if it is determined that the participant was talking within the time period, then, consequently, deciding not to enable the participant to replay stored data representative of a missed portion of the virtual meeting.

2. The method of claim 1, further comprising:
   accessing stored information about at least a part of the virtual meeting during the time period, the accessed information including at least one voice activity detection flag corresponding to a time within the time period.

3. The method of claim 2, wherein said determining comprises:
   analyzing the at least one voice activity detection flag; and
   determining, as a result of the at least one voice activity detection flag being asserted, that the participant was talking within the time period.

4. The method of claim 2, wherein:
   said determining further comprises determining one or more characteristics of said talking.

5. The method of claim 4, wherein:
   the accessed information includes a plurality of voice activity detection flags corresponding to the time period; and said determining one or more characteristics of said talking comprises analyzing the plurality of voice activity detection flags to thereby determine one or more of: for what proportion of the time period the participant was talking, a total number of bursts of speech by the participant during the time period or a longest burst of speech by the participant during the time period.

6. The method of claim 1,
further comprising determining how long ago the participant was disconnected from the virtual meeting, and
wherein said deciding comprises deciding not to enable the participant to replay stored information representative of a missed portion of the virtual meeting only if it is determined that the participant was disconnected from the virtual meeting more than a predetermined length of time ago.

7. The method of claim 1, further comprising:
if it is determined that the participant was not talking within the time period, then, consequently, deciding to enable the participant to replay stored data representative of a missed portion of the virtual meeting.

8. A non-transitory computer readable storage medium comprising a sequence of instructions which, when performed by one or more processing devices, cause the one or more processing devices to perform a method comprising:
using, by one or more virtual-meeting processing devices, collected network information to determine whether any participant in a plurality of participants in a virtual meeting was disconnected from the virtual meeting;
in response to determining that a participant was disconnected from the virtual meeting, performing by the one or more virtual-meeting processing devices:
determining a time at which the participant was disconnected from a virtual meeting;
determining whether or not the participant was talking within a time period containing the time at which the participant was disconnected from the virtual meeting; and
if it is determined that the participant was talking within the time period, then, consequently, deciding not to enable the participant to replay stored data representative of a missed portion of the virtual meeting.

9. The medium of claim 8, further comprising:
accessing stored information about at least a part of the virtual meeting during the time period, the accessed information including at least one voice activity detection flag corresponding to a time within the time period.

10. The medium of claim 9, wherein said determining comprises:
analyzing the at least one voice activity detection flag; and
determining, as a result of the at least one voice activity detection flag being asserted, that the participant was talking within the time period.

11. The medium of claim 9, wherein:
said determining further comprises determining one or more characteristics of said talking.

12. The medium of claim 11, wherein:
the accessed information includes a plurality of voice activity detection flags corresponding to the time period; and
said determining one or more characteristics of said talking comprises analyzing the plurality of voice activity detection flags to thereby determine one or more of: for what proportion of the time period the participant was talking, a total number of bursts of speech by the participant during the time period or a longest burst of speech by the participant during the time period.

13. The medium of claim 8,
further comprising determining how long ago the participant was disconnected from the virtual meeting, and
wherein said deciding comprises deciding not to enable the participant to replay stored information representative of a missed portion of the virtual meeting only if it is determined that the participant was disconnected from the virtual meeting more than a predetermined length of time ago.

14. An apparatus for facilitating re-joining of a virtual meeting having a plurality of participants, the apparatus comprising:
one or more processing devices;
a non-transitory computer readable storage medium comprising a sequence of instructions which, when performed by one or more processing devices, cause the one or more processing devices to perform a method comprising:
using, by one or more virtual-meeting processing devices, collected network information to determine whether any participant in the plurality of participants was disconnected from the virtual meeting;
in response to determining that a participant was disconnected from the virtual meeting, performing by the one or more virtual-meeting processing devices:
determining a time at which the participant was disconnected from the virtual meeting;
determining whether or not the participant was talking within a time period containing the time at which the participant was disconnected from the virtual meeting; and
if it is determined that the participant was talking within the time period, then, consequently, deciding not to enable the participant to replay stored data representative of a missed portion of the virtual meeting.

15. The apparatus of claim 14, further comprising:
accessing stored information about at least a part of the virtual meeting during the time period, the accessed information including at least one voice activity detection flag corresponding to a time within the time period.

16. The apparatus of claim 15, wherein said determining comprises:
analyzing the at least one voice activity detection flag; and
determining, as a result of the at least one voice activity detection flag being asserted, that the participant was talking within the time period.

17. The apparatus of claim 15, wherein:
said determining further comprises determining one or more characteristics of said talking.

18. The apparatus of claim 17, wherein:
the accessed information includes a plurality of voice activity detection flags corresponding to the time period; and
said determining one or more characteristics of said talking comprises analyzing the plurality of voice activity detection flags to thereby determine one or more of: for what proportion of the time period the participant was talking, a total number of bursts of speech by the participant during the time period or a longest burst of speech by the participant during the time period.

19. The apparatus of claim 14, further comprising
determining how long ago the participant was disconnected from the virtual meeting, and wherein said deciding comprises deciding not to enable the participant to replay stored information representative of a missed portion of the virtual meeting only if it is determined that the participant was disconnected from the virtual meeting more than a predetermined length of time ago.

20. The apparatus of claim 14, further comprising:
if it is determined that the participant was not talking within the time period, then, consequently, deciding to enable the participant to replay stored data representative of a missed portion of the virtual meeting.

\* \* \* \* \*